US012118834B2

(12) United States Patent
Sizemore

(10) Patent No.: US 12,118,834 B2
(45) Date of Patent: Oct. 15, 2024

(54) VEHICLE DIAGNOSTIC TOOL

(71) Applicant: Rivian IP Holdings, LLC, Plymouth, MI (US)

(72) Inventor: Tyler Sizemore, Normal, IL (US)

(73) Assignee: Rivian IP Holdings, LLC, Irvine, CA (US)

( * ) Notice: Subject to any disclaimer, the term of this patent is extended or adjusted under 35 U.S.C. 154(b) by 232 days.

(21) Appl. No.: 17/890,662

(22) Filed: Aug. 18, 2022

(65) Prior Publication Data

US 2024/0062593 A1 Feb. 22, 2024

(51) Int. Cl.
*G07C 5/08* (2006.01)
*G07C 5/00* (2006.01)

(52) U.S. Cl.
CPC ........... *G07C 5/0808* (2013.01); *G07C 5/008* (2013.01)

(58) Field of Classification Search
CPC .............................. G07C 5/0808; G07C 5/008
See application file for complete search history.

(56) References Cited

U.S. PATENT DOCUMENTS

| | | | | |
|---|---|---|---|---|
| 6,816,760 | B1 * | 11/2004 | Namaky | G06F 11/2733 701/33.2 |
| 11,954,948 | B1 * | 4/2024 | Herron | G07C 5/008 |
| 2016/0042578 | A1 * | 2/2016 | Whitehead | G07C 5/0808 701/33.3 |
| 2018/0144562 | A1 * | 5/2018 | Haro | G07C 5/0858 |
| 2019/0089019 | A1 * | 3/2019 | Lee | H01M 10/4285 |

* cited by examiner

*Primary Examiner* — Aaron L Troost
(74) *Attorney, Agent, or Firm* — Foley & Lardner LLP

(57) ABSTRACT

Disclosed are systems and methods for a device. The device can include a connector to electrically couple with a component of a vehicle via a first electrical connection of the connector and a second electrical connection of the connector. The connector can provide power to the component of the vehicle via the first electrical connection of the connector. The device can include a communication component to transfer a data packet between the device and the component of the vehicle via the second electrical connection of the connector. The component of the vehicle can be disconnected from a power source of the vehicle.

17 Claims, 10 Drawing Sheets

VEHICLE DIAGNOSTIC TOOL

INTRODUCTION

A vehicle, such as an electric vehicle, can be powered by batteries. The vehicle can include components that operate the vehicle based on power provided by the batteries.

SUMMARY

The technical solution described herein can include a diagnostic tool that powers components of a vehicle and communicates with the components of the vehicle. The diagnostic tool can interface with the component of the vehicle when the component is removed from the vehicle, located outside the vehicle, or disconnected from electrical cables or connections of the vehicle. The diagnostic tool can include a power supply module. The power supply module can include power regulating components, power filtering components, transformers, converters, batteries, or external power source connections. The diagnostic tool can include communication components. The communication components can connect with the component of the vehicle and receive data from the component of the vehicle or transmit data to the component of the vehicle. The diagnostic tool can include connections for connecting another external tool to the component of the vehicle. For example, another tool can connect to the component of the vehicle through the diagnostic tool and communicate with the component of the vehicle through the diagnostic tool.

At least one aspect is directed to a device. The device can include a connector. The connector can electrically couple with a component of a vehicle via a first electrical connection of the connector and a second electrical connection of the connector. The connector can provide power to the component of the vehicle via the first electrical connection of the connector. The device can include a communication component to transfer a data packet between the device and the component of the vehicle via the second electrical connection of the connector. The component of the vehicle can be disconnected from the vehicle.

At least one aspect is directed to a method. The method can include connecting, via a connector of a tool, with a component of a vehicle to electrically couple the tool with the component of the vehicle via a first electrical connection of the connector and a second electrical connection of the connector. The method can include providing, by the connector, power to the component of the vehicle via the first electrical connection of the connector. The method can include transferring, by a communication component of the tool, a data packet between the tool and the component of the vehicle via the second electrical connection of the connector. The component of the vehicle can be disconnected from the vehicle.

At least one aspect is directed to an electric vehicle tool. The electric vehicle tool can include a connector to electrically couple with a component of an electric vehicle via a first electrical connection of the connector and a second electrical connection of the connector. The connector can provide power to the component of the electric vehicle via the first electrical connection of the connector. The electric vehicle tool can include a communication component to transfer a data packet between the electric vehicle tool and the component of the vehicle via the second electrical connection of the connector. The component of the vehicle can be disconnected from the vehicle.

At least one aspect is directed to a method. The method can include providing a tool. The tool can include a connector to electrically couple with a component of a vehicle via a first electrical connection of the connector and a second electrical connection of the connector. The connector can provide power to the component of the vehicle via the first electrical connection of the connector. The tool can include a communication component to receive a data packet from the component of the vehicle via the second electrical connection of the connector.

At least one aspect is directed to a tool. The tool can include an enclosure. The tool can include a connector to electrically couple with a component of a vehicle via a first electrical connection of the connector and a second electrical connection of the connector. The connector can to provide power to the component of the vehicle via the first electrical connection of the connector. The tool can include a communication component to receive a data packet from the component of the vehicle via the second electrical connection of the connector.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
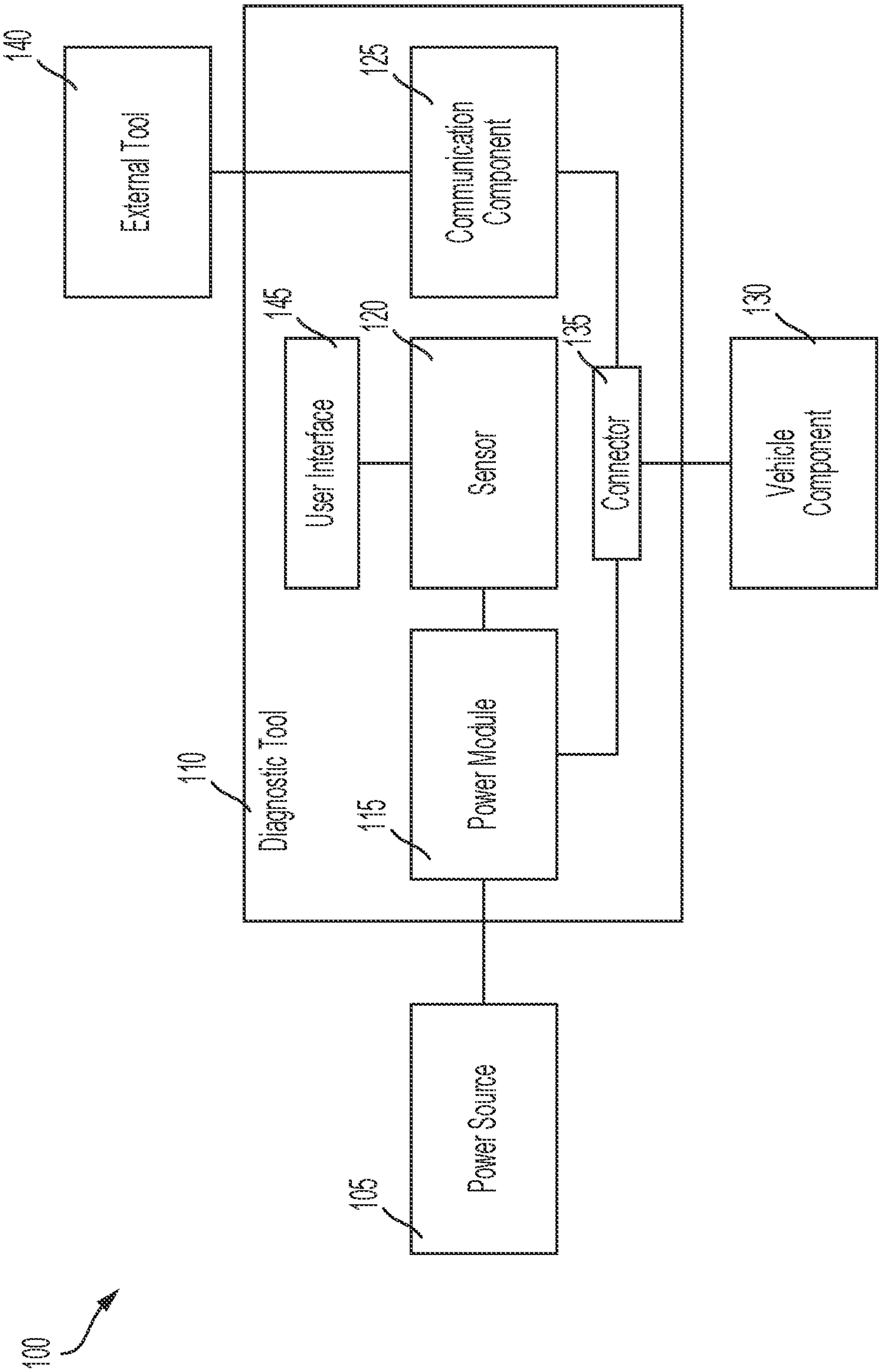
FIG. 1 depicts an example diagnostic tool.

Following below are more detailed descriptions of various concepts related to, and implementations of, methods, apparatuses, and systems of a diagnostic tool for a vehicle. The various concepts introduced above and discussed in greater detail below may be implemented in any of numerous ways.

This disclosure is generally directed to systems and methods for a vehicle diagnostic tool that performs diagnostics on components of a vehicle, such as an electric vehicle. A vehicle can include components that, when removed from the vehicle, are not readily able to communicate with external systems. For example, a harness (e.g., cable) of the vehicle that can provide power to or receive data from the vehicle component may not be long enough to reach the vehicle component once the vehicle comment is removed from the vehicle. For example, components of an electric vehicle such as battery management systems, motors, motor drives, motor controllers, high-voltage interlock loops (HVILs), or high-voltage (HV) contactors can include electrical components such as microprocessors, computer systems, or data processing systems that are powered by a power source of the electric vehicle (e.g., by battery cells, by a charging station, by an alternator). The electrical components can communicate with data processing systems of the vehicle or external systems via communication networks, e.g., a controller area network (CAN). However, when a component of the vehicle is removed from the vehicle, the vehicle is no longer powering the component of the vehicle and an external system may not be able to communicate with the component. A test environment can be designed and constructed to test the component while the component is outside the vehicle. However, the test environment may need many different pieces of hardware connected in a complex manner. Furthermore, the electrical connections for powering the component or communicating with the component may not be readily accessible, e.g., they may not be in a standard format or configuration.

To solve these and other technical problems, at least one technical solution described herein can include a diagnostic tool that powers components of a vehicle and communicates with the components of the vehicle. The diagnostic tool can interface with the component of the vehicle when the component is removed from the vehicle, located outside the vehicle, or disconnected from the vehicle, e.g., disconnected from electrical cables, electrical connections, or mechanical connections of the vehicle. The diagnostic tool can power the component of the vehicle. The diagnostic tool can communicate with the component of the vehicle when the component is powered.

The diagnostic tool can include a power supply module. The power supply module can include power regulating components, power filtering components, transformers, converters, batteries, or external power source connections. The power supply module can convert power received from an external power source, e.g., 120V alternative current (AC), at a level that the component of the vehicle can consume, e.g., 12V direct current (DC). The power supply module can provide power to an external connection of the diagnostic tool. The component of the vehicle can be powered by the power provided by the power supply module.

The diagnostic tool can include communication components. The communication components can connect with the component of the vehicle and receive data from the component of the vehicle or transmit data to the component of the vehicle. The component of the vehicle can include electrical hardware powered by the power source module of the diagnostic tool. The electrical hardware can communicate with the diagnostic tool responsive to being powered or based on the power. The diagnostic tool can diagnose the component of the vehicle based on the communication, e.g., detecting if the component of the vehicle is sourcing power, detecting a level of current sourced by the component of the vehicle, detecting whether the component of the vehicle is communicating properly, monitoring the component of the component of the vehicle for performance. The diagnostic tool can include connections for connecting another external tool to the component of the vehicle. For example, another tool can connect to the component of the vehicle through the diagnostic tool and communicate with the component of the vehicle through the diagnostic tool.

FIG. 1 depicts a system 100 including at least one diagnostic tool 110. The diagnostic tool 110 can be a device, an apparatus, or a system. The diagnostic tool 110 can electrically couple with at least one vehicle component 130. The diagnostic tool 110 can be a device, system, or apparatus that can be used to obtain data about or perform diagnostics on or related to a vehicle component 130. The diagnostic tool 110 can be a component separate from a vehicle that can be used to test the vehicle component 130 in a laboratory, in a garage, in a service area, on a road, off road, in a rest area. The diagnostic tool 110 can be used to test the vehicle component 130. The vehicle component 130 can be or include a battery pack, a battery module, a battery cell, a battery management system, an energy storage system (ESS), an HVIL, an HV contactor, a motor, a motor drive, a motor controller, a drive train component, or any other component of a vehicle.

The diagnostic tool 110 can be or include a portable component that can be transported around a garage, stored in a vehicle, stored on a workbench. The diagnostic tool 110 can be used remotely, such that the tool may not need or include any cables or interconnection with the power source 105. The diagnostic tool 110 can be used by a mobile service technician that drives to a location of a vehicle and performs diagnostics on the vehicle with the diagnostic tool 110. The diagnostic tool 110 can be rugged or resistant to weather, e.g., include an enclosure that encloses the components of the diagnostic tool 110 and prevents the diagnostic tool 110 from being affected by water, wind, rain, snow, mud, dirt, dust, debris. The vehicle component 130 can be a component of a vehicle, such as an electric vehicle. The vehicle component 130 can be a component removed from a vehicle or intended for installation in the vehicle. The vehicle component 130 can be a component installed in a vehicle.

The diagnostic tool 110 can diagnose a communication issue between a vehicle system and the vehicle component 130. The diagnostic tool 110 can diagnose an operating issue of the vehicle component 130. The diagnostic tool 110 can test the vehicle component 130 to verify that the vehicle component 130 has exited out of a bootloader mode. For example, the diagnostic tool 110 can determine if the vehicle component 130 is drawing a low amount of current, indicating that the vehicle component 130 is in the bootloader mode or is drawing a higher amount of current, indicating that the vehicle component 130 was properly flashed with firmware and exited the bootloader mode. The diagnostic tool 110 can analyze an HV contactor to determine whether contactors are operating and determine the state of the contactors. The diagnostic tool 110 can test the series circuit of an HVIL that runs through high voltage connectors. The diagnostic tool 110 can identify or assist in identifying whether a component of the vehicle is not plugged in or has a loose connection that may stop a vehicle from operating.

The diagnostic tool 110 can include at least one connector 135. The connector 135 can electrically couple the diagnostic tool 110 with the vehicle component 130. The connector 135 can include at least one cable. The cable can include at least one wire. The wires can provide power to the vehicle component 130. The wires can receive data from the vehicle component 130 or transmit data to the vehicle component

130. The connector 135 can include at least one plug. The cable can be a connection cable that connects to the vehicle component 130 and the diagnostic tool 110. The connection cable can make electrical connections with the vehicle component 130. The connector 135 can include a plug on the diagnostic tool 110 for plugging a cable into. The plug can be a HDP24-24-21PN connector, an RS-485 connector, an Ethernet connector, a universal serial bus (USB) connector. The connector 135 can include another plug on an end of the cable for plugging into the vehicle component 130. The connector can be an HDP26-26-21SN connector, an RS-485 connector, an Ethernet connector, a USB connector.

The diagnostic tool 110 can provide power to the vehicle component 130 via the connector 135. The diagnostic tool can receive data packets from the vehicle component 130 via the connector 135. The connector 135 can include at least one electrical connection between the diagnostic tool 110 and the vehicle component 130. At least one first electrical connection of the connector 135 can provide power to the vehicle component 130. For example, a positive electrical connection and a ground electrical connection of the connector 135 can provide power to the vehicle component 130.

At least one second electrical connection of the electrical connector 135 can receive data packets from the vehicle component 130. The data packets can be or include messages, pieces of information, data, publications, strings, data frames. The data packets can include data describing the status of the vehicle component 130 or characteristics of the vehicle component 130. For example, the data packets can indicate measurements of the vehicle component 130, operating settings of the vehicle component 130, a state of the vehicle component 130, faults of the vehicle component 130, flags of the vehicle component 130. The electrical connections can include transmit lines, receive lines, clock lines, differential signal lines, high lines, low lines. The electrical connections can be connections for a controller area network (CAN), an Inter-Integrated Circuit (I2C) connection, a universal asynchronous receiver-transmitter (UART) connection, a universal synchronous asynchronous receiver-transmitter (USART) connection, an RS-485 connection, a USB connection, an Ethernet connection, or any other electrical connection. The electrical connections can be high CAN connections or low CAN connections for performing communication on a CAN bus.

The diagnostic tool 110 can receive power from at least one power source 105. The power source 105 can power the diagnostic tool 110. The power source 105 can include a power source separate from the diagnostic tool 110. The power source 105 can include an electrical outlet of a home, garage, service area, camp site, rest stop. The power source 105 can include an electrical grid. The power source 105 can be vehicle, e.g., a battery, battery module, or battery pack of the vehicle. The diagnostic tool 110 can connect to an outlet of the electric vehicle to receive power. The power source 105 can be or include a battery pack, battery module, or battery cell of a garage, home, office, commercial building, residential building, or vehicle, for example. The diagnostic tool 110 can include at least one power module 115. The power module 115 can be a power supply internal to the diagnostic tool 110. The power module 115 can include at least one transformer, converter, full-bridge rectifier, half-bridge rectifier, filter, battery, or other electrical component to power the diagnostic tool 110. The power module 115 can receive power from the power source 105. The power module 115 can convert the power received from the power source 105. The power module 115 can power components of the diagnostic tool 110, the vehicle component 130, or the external tool 140. The power module 115 can provide power to the vehicle component 130 via the connector 135.

The power module 115 can receive a first type of power from the power source 105. The first type of power can be AC power at a variety of voltage levels (e.g., 120V, 230V, or 240V) at a variety of frequencies (e.g., 50 Hz or 60 Hz). The power module 115 can convert the first type of power to a second type of power. The power module 115 can convert DC power into AC power. The power module 115 can convert DC power at a first voltage level into DC power at a second voltage level. The power module 115 can provide the converted power to the vehicle component 130 via the connector 135 to power the vehicle component 130 or components of the vehicle component 130. For example, the power module 115 can convert the AC power into DC power, e.g., convert the AC voltage into a DC voltage. The DC voltage could be a 24 volt DC voltage. The DC voltage could be a 12 volt DC voltage. The DC voltage could be a 10 volt DC voltage. The DC voltage an 8 volt DC voltage. The DC voltage can be greater than 24 volts DC or less than 8 volts DC. The power module 115 can supply current. The current can be 3 amperes. The current can be 5 amperes. The current can be 10 amperes. The current can be less than 3 amperes. The current can be greater than 10 amperes. The voltage and current provided by the power module 115 can be based on a required voltage or current for powering the vehicle component 130. The power module 115 can include a selector that allows a user to select between different voltage or current outputs such that a user can select the appropriate voltage or current setting to power the vehicle component 130. For example, a first vehicle component 130 can require a first voltage. The power module 115 can be set to provide the first voltage. A second vehicle component 130 can require a second voltage. The power module 115 can be set to provide the second voltage.

The diagnostic tool 110 can include at least one sensor 120. The sensor 120 can sense, detect, measure, or determine a characteristic of the vehicle component 130. The sensor 120 can be or include a voltage sensor. The voltage sensor can measure a voltage applied to electrical contacts or connections of the vehicle component 130 by the power module 115. The voltage sensor can measure a DC voltage. The voltage sensor can measure an AC voltage. The voltage sensor can be a capacitive type voltage sensor or a resistive type voltage sensor. The sensor 120 can be or include a current sensor. The current sensor can measure an DC current. The current sensor can measure an AC current. The current sensor can be or include a closed-loop current sensor or an open-loop current sensor. The current sensor can measure an amount of current provided by the power module 115 to the vehicle component 130. The current sensor can measure the amount of current sourced by the vehicle component 130 from the power module 115. The current sensor can measure an amount of current synched by the vehicle component 130 to the diagnostic tool 110.

The diagnostic tool 110 can include at least one communication component 125. The communication component 125 can connect to the vehicle component 130 through the connector 135. For example, communication component 125 can connect to the vehicle component 130 through at least one electrical connection of the connector 135. The communication component 125 can transfer or communicate data packets between the diagnostic tool 110 and the vehicle component 130. For example, the communication component 125 can receive data packets from the vehicle component 130. For example, the communication component 125 can receive data packets from the vehicle component 130 via at least one electrical connection of the connector 135 with the vehicle component 130. The communication component 125 can transmit data packets to the vehicle component 130. For example, the communication component 125 can transmit data packets to the vehicle component 130 via at least one electrical connection of the connector 135 with the vehicle component 130.

The communication component 125 can include wires, traces, plugs or other electrical components that make electrical connections with the connector 135 and the vehicle component 130. The communication component 125 can include wires, traces, plug, or other electrical components that make electrical connections with the external tool 140. The communication component 125 can include a deutsch 3-pin connector (DT04-3P connector) to connect with the external tool 140. The communication component 125 can include a DB9 connector to connect with the external tool 140. The communication component 125 can include termination resistors for a bus connection, e.g., a CAN bus.

The communication component 125 can make electrical connections with an external tool 140. The communication component 125 can provide the data packets to the external tool 140 via the electrical connections. The communication component 125 can make electrical connections between communication contacts or connections of the vehicle component 130 and the external tool 140 such that data packets can pass through the diagnostic tool 110 from the vehicle component 130 to the external tool 140. The communication component 125 can further include memory components. The communication component 125 can receive the data packets via the connector 135 and store the data packets. The communication component 125 can retrieve the data packets from the memory component and transmit the data packets to the external tool 140.

The external tool 140 can include a data processing system such as a smartphone, a laptop, a tablet, a desktop computer, a console, a cloud computing system, a server, a client device. The external tool 140 can be a CAN tool that parses data packets indicating CAN messages. The external tool 140 can read CAN messages, translate the CAN messages into data, and display the data on a display.

The diagnostic tool 110 can include at least one user interface 145. The user interface 145 can display information to a user, technician, or user. The user interface 145 can be a segment display (e.g., a 7-segment display), a liquid crystal display (LCD), light emitting diode (LED) display, an organic LED (OLED) display. The user interface 145 can display visual representations of information. For example, the user interface 145 can display a visual representation (e.g., numbers or text) representing a voltage sensed by the sensor 120, a current measurement of the sensor 120, a power measurement of the sensor 120.

Figure 2:
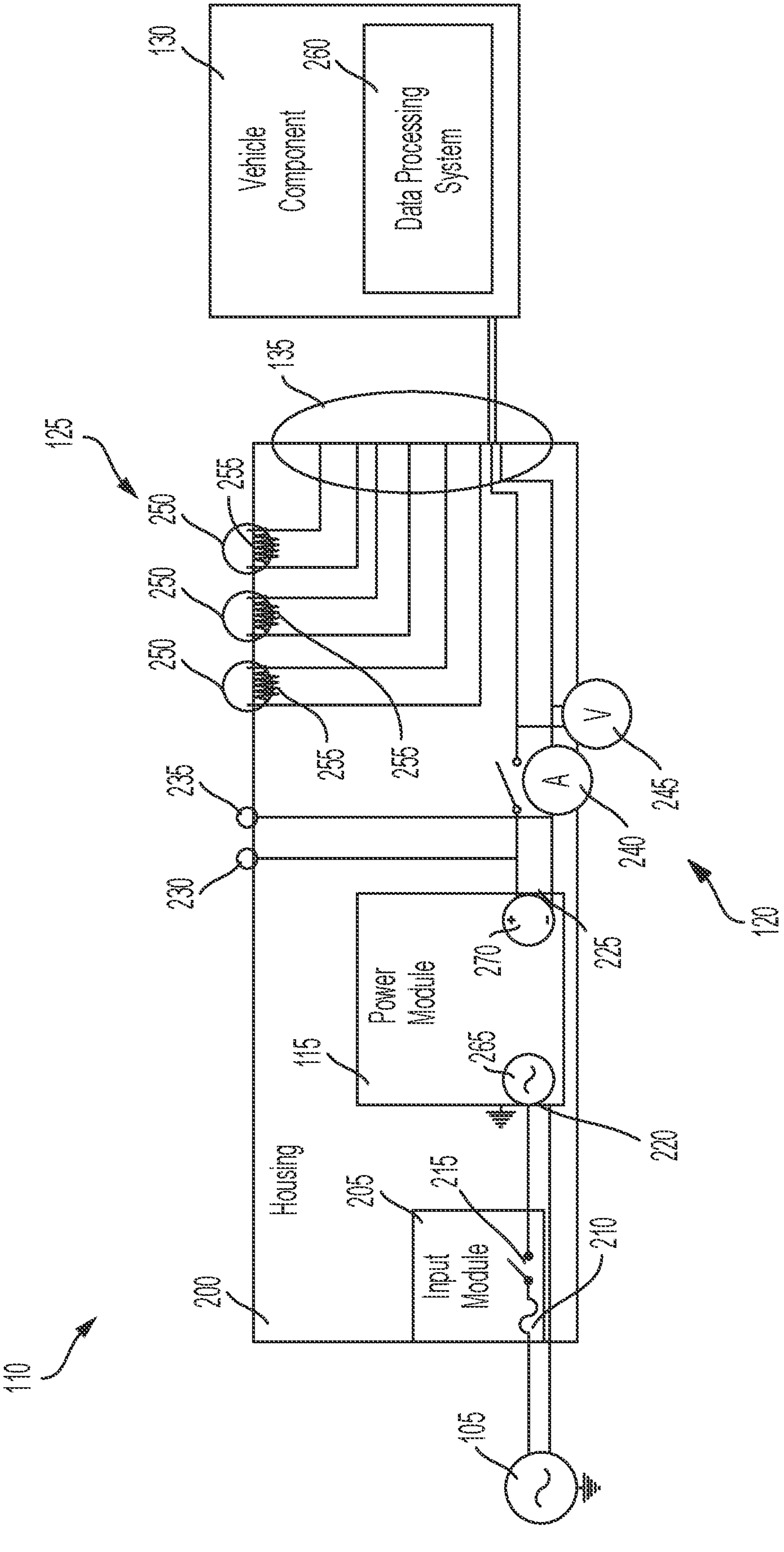
FIG. 2 depicts the example diagnostic tool including a housing.

FIG. 2 depicts an example diagnostic tool 110 including at least one housing 200. The components of the diagnostic tool 110 can be disposed within the housing 200. The housing 200 can be a plastic housing (e.g., polycarbonate, polypropylene, polyvinyl). The housing 200 can be a metal housing (e.g., aluminum, tin, steel). The housing 200 can be or include a cover, one, two, three, or four lateral walls, and a bottom portion for example. The housing 200 can form a complete or partial enclosure. The housing 200 can include an opening or a cavity. The components of the diagnostic tool 110 can be disposed within the cavity. The power module 115 can be disposed within the housing 200. The communication component 125 can be disposed within the housing 200. The housing 200 can prevent wind, rain, snow, mud, dirt, dust, or other elements from entering into the housing 200. The housing 200 can include a lid or cover that can hinge on at least one hinge member fixed to a body portion of the housing 200. The lid can hinge from an open position exposing the cavity of the housing 200 or a closed position. In the closed position, the lid can form a seal with the body portion of the housing 200. A snap, lock, or connector can press the lid against the body portion of the housing 200. The seal can be airtight or water tight. The seal can prevent gases, liquids (e.g., water), or debris (e.g., mud, dirt, dust, snow) from entering the housing 200.

The diagnostic tool 110 can include at least one input module 205. The input module 205 can be an assembly, e.g., a switch/fuse assembly. The input module 205 can make electrical connections with the power source 105. For example, the input module 205 can include at least one plug. A cord or cable can be plugged into the input module 205 via the plug and provide power from the power source 105 to the input module 205. The cable can be a C13 power cable. The cable can be of various lengths, for example, 25 feet long. The cable can be 15 feet long. The cable can be greater than 25 feet long. The cable can be less than 15 feet long. The cable length can be sized to allow the diagnostic tool 110 to be moved around a garage, workspace, or other area between the power source 105 and the vehicle component 130.

The input module 205 can include at least one fuse 210. The fuse 210 can break a connection between the power source 105 and the vehicle component 130 responsive to a level of current provided by the power source 105 exceeding a threshold. The fuse 210 can form an open circuit responsive to a level of current being above a threshold. The fuse can be a 120 volt 15 ampere fuse. The fuse can be a 100 volt fuse. The fuse can be a 140 volt fuse. The fuse voltage can be based on a voltage of the power source 105. The fuse 210 can be a 10 ampere fuse. The fuse 210 can be a 20 ampere fuse. The fuse 210 can have an ampere level based on a current level that the components of the diagnostic tool 110 or the vehicle component 130 can handle. The input module 205 can include a switch 215. The switch 215 can complete or break a connection to provide power received from the power source 105 to the vehicle component 130. The switch 215 can connect power from the power source 105 to the power module 115. The switch can disconnect power between the power source 105 and the power module 115. The switch 215 can be mounted on a surface of the housing 200. The switch 215 can be accessible through an opening of the housing 200. The switch 215 can be mounted to a circuit board and extend through an opening of the housing 200. The switch 215 can be a rocker switch, a pushbutton switch, a selector switch, or any other type of switch. The input module 205 can make electrical connections with the power module 115 (e.g., a positive connection and a negative connection). The input module 205 can provide power from the power source 105 to the power module 115 via the electrical connections.

The power module 115 can include electrical connections 220 to receive power from the input module 205. The electrical connections 220 can receive AC power 265. The power module 115 can convert the AC power 265 into DC power 270. The power module 115 can output DC power 270 via connections 225. The power module 115 can provide power to the vehicle component 130 via the connector 135. The sensor 120 can monitor the power sourced by the vehicle component 130. For example, a current sensor 240 can measure a current sourced by the vehicle component 130. At least one voltage sensor 245 can measure a voltage provided to the vehicle component 130.

The power module 115 can output power to external connections 230 and 235. The external connections 230 and 235 can provide power out of the diagnostic tool 110. The external connections 230 and 235 can be plugs. For example, banana plugs, an outlet plug, alligator clips. Another vehicle component or testing apparatus can be powered via the connections 230 and 235. For example, in some cases, two vehicle components may need to be tested together. A first vehicle component can be powered via the connections 230 and 235. The second vehicle component can be powered via the connector 135 and data packets can be received from the second vehicle via the connector 135. The diagnostic tool 110 can include a switch that controls power to the external connections 230 and 235. The switch can break or complete a circuit between the power module 115 and the external connections 230 and 235. The switch can be a rocker switch, a pushbutton switch, a selector switch, or any other type of switch.

The communication component 125 can include at least one connector 250. The connectors 250 can make electrical connections with at least one external tool 140. The connectors 250 can include termination resistors 255. The termination resistors 255 can terminate a set of communication wires. The termination resistor 255 can be 120 ohm resistor, 100 ohm resistor, or a 140 ohm resistor. The termination resistor 255 can be a CAN termination. The termination resistor 255 can eliminate or reduce the need for an external CAN termination. Each of the connectors 250 can make electrical connections through the connector 135 to a different communication channel, e.g., CAN communication channels, of the vehicle component 130. For example, the vehicle component 130 can output a first communication channel via a first set of electrical connections of the connector 135 and a second communication channel via a second set of electrical connections of the connector 135. The vehicle component 130 can communicate first data packages to the diagnostic tool 110 via the first communication channel and communicate second data packets to the diagnostic tool 110 via the second communication channel. The communication component 125 can receive data packets of a variety of communication channels via the connector 135. A first communication connector 250 can provide first data packets of the data packets received via the connector 135 via a first communication channel of the vehicle component 130 to the external tool 140. A second communication connector 250 can provide second data packets of the data packets received via the connector 135 via a second communication channel of the vehicle component 130 to the external tool 140 (or another external tool).

The vehicle component 130 can include a data processing system 260. The data processing system 260 can include processors, memory units, hard drives, etc. The data processing system 260 can be a system that operates the vehicle component 130. The data processing system 260 can be a system that monitors the performance of the vehicle component 130. The data processing system 260 can be a system that collects data of the vehicle component 130. The data processing system 260 can transmit data packets indicating characteristics of the vehicle component 130. For example, the characteristics can indicate statuses, states, flags, faults, measured values, battery charge levels, battery cell or module voltage, battery cell or module temperature, or other data of the vehicle component 130. The data processing system 260 can transmit first data packets of a first communication channel to the diagnostic tool 110 via the connector 135. The data processing system 260 can transmit second data packets of a second communication channel to the diagnostic tool 110 via the connector 135.

The diagnostic tool 110 can test the vehicle component 130 while the vehicle 300 is being manufactured. For example, the diagnostic tool 110 can be used to test whether the vehicle 300 is properly flashed with firmware. If the vehicle component 130 is not properly flashed with firmware, the current drawn by the vehicle component 130 may be a first level. If the vehicle component 130 is properly flashed with the firmware, the current drawn by the vehicle component 130 may be a second level greater than the first level. The diagnostic tool 110 can power the vehicle component 130 and provide communication connectors 250 for an external system to transmit firmware through the connector 250 and the connector 135 to the data processing system 260. This can cause the data processing system 2160 to store the firmware. The data processing system 260 can store the firmware based on power provide by the diagnostic tool 1110 to the vehicle component 130.

The diagnostic tool 110 can include a data processing system. The data processing system can include one or more processors, coupled with memory. The data processing system can receive data packets from the vehicle component 130 (e.g., a battery pack) from the connector 135 and the communication component 125. The data packets can include characteristics of a battery pack. For example, the characteristics can be temperatures of battery modules or battery cells of the battery pack, voltages of the battery modules or battery cells of the battery pack, state of charge levels of the battery modules or the battery cells of the battery pack. The data processing system can generate diagnostic data. The diagnostic data can be a translation of encoded information of the data packets into representations of the characteristics of the battery pack, e.g., numerical representations, graphical representations. The diagnostic data can be derived or calculated from the values of the characteristics of the battery pack. The diagnostic tool 110 can cause a display device to display the diagnostic data, e.g., print the diagnostic data on a graphical user interface, cause the graphical user interface to include graphic elements representing the diagnostic data. An exemplary data processing system and display is described at least at FIG. 10.

Figure 3:
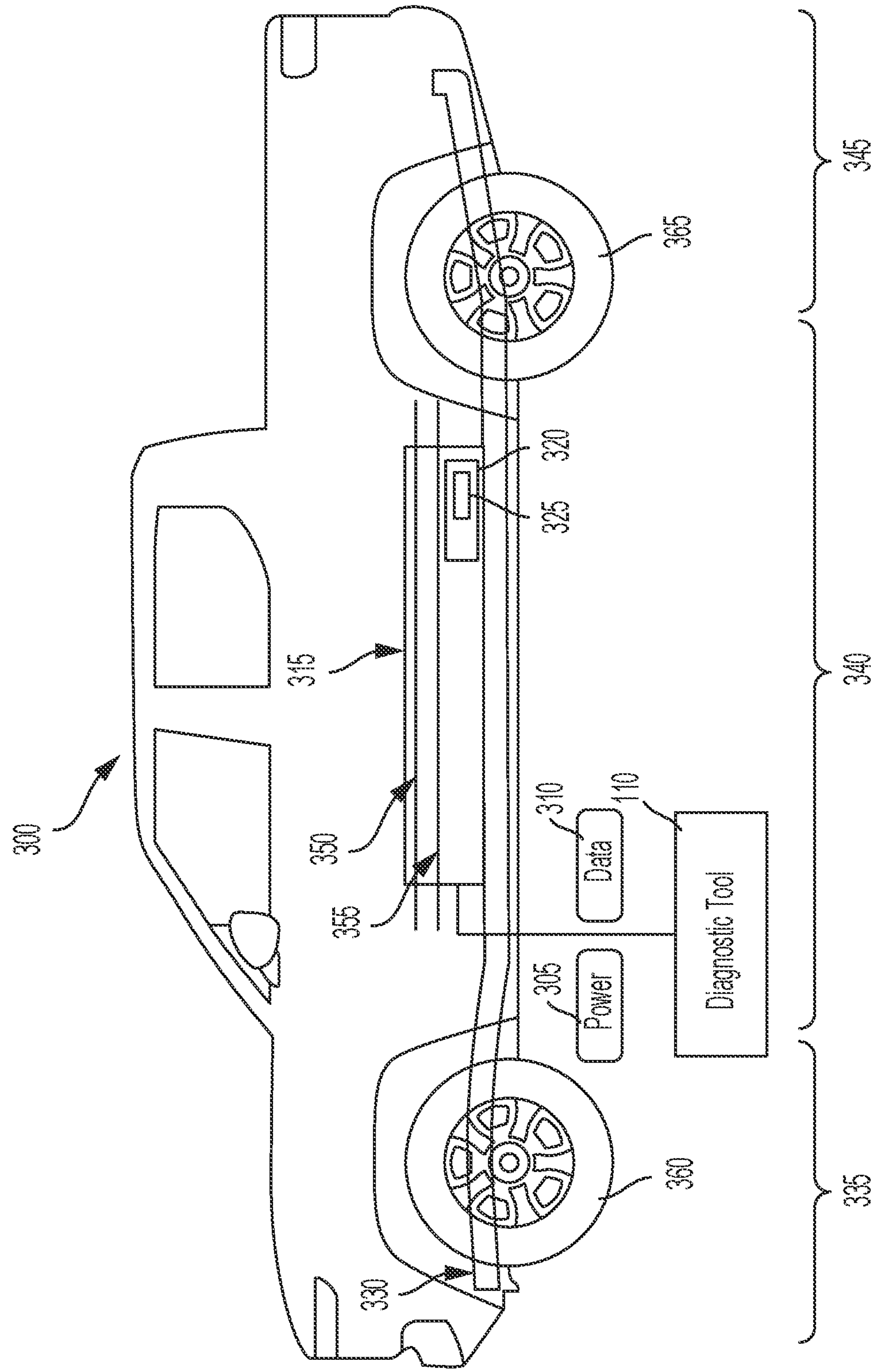
FIG. 3 depicts an example vehicle where a diagnostic tool provides power to a component of the vehicle and receives data from the component.

FIG. 3 depicts an example vehicle 300 where a diagnostic tool 110 provides power 305 to a vehicle component 130 (e.g., at least one battery pack 315) of the vehicle 300 and receives data 310 from the component. The vehicle 300 can be installed with at least one the vehicle component 130, such as at least one battery pack. The vehicle 300 can be an electric vehicle. Electric vehicles 300 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 315 can be used as an energy storage system to power a building, such as a residential home or commercial building. Electric vehicles 300 can be fully electric or partially electric (e.g., plug-in hybrid). The vehicle 300 can be a gas, diesel, or hydrogen powered vehicle. The electric vehicles 300 can be fully autonomous, partially autonomous, or unmanned. Electric vehicles 300 can be human operated or non-autonomous. Electric vehicles 300 such as electric trucks or automobiles can include on-board battery packs 315, battery modules 320, or battery cells 325 to power the electric vehicles.

The vehicle 300 can include a chassis 330 (e.g., a frame, internal frame, or support structure). The chassis 330 can support various components of the vehicle 300. The chassis 330 can span a front portion 335 (e.g., a hood or bonnet portion), a body portion 340, and a rear portion 345 (e.g., a trunk, payload, or boot portion) of the electric vehicle 300. The battery pack 315 can be installed or placed within the vehicle 300. For example, the battery pack 315 can be installed on the chassis 330 of the vehicle 300 within one or more of the front portion 335, the body portion 340, or the rear portion 345. The battery pack 315 can include or connect with at least one busbar, e.g., a current collector element. For example, the first busbar 350 and the second busbar 355 can include electrically conductive material to connect or otherwise electrically couple the battery modules 320 or the battery cells 325 with other electrical components of the vehicle 300 to provide electrical power to various systems or components of the vehicle 300.

The vehicle 300 can include at least one front wheel 360 and at least one rear wheel 365. The vehicle 300 can include one or multiple motors. The motors can drive an axel connected to two front wheels 360 or an axel connected to two rear wheels 365. A single motor can drive an axel of the two front wheels 360. A single motor can drive an axel of the two rear wheels 365. Each wheel of the wheels 360 and 365 can be driven by an individual motor. For example, each of the four wheels 360 and 365 can be driven by one of four motors. The battery pack 315 can discharge stored energy to power the motors of the front wheels 360 and the rear wheels 365. The battery pack 315 can discharge stored energy to generate power that the motors receive. Operating the motors of the wheels 360 and 365 can cause the vehicle 300 to drive forward, reverse, or turn. A tractive component, e.g., the motor, can transports the electric vehicle 300 based on power received from the battery cells 325.

The diagnostic tool 110 can connect with the battery pack 315 via the connector 135. The diagnostic tool 110 can provide power to a data processing system 260 of the battery pack 315, e.g., a battery management system. The diagnostic tool 110 can power the battery management system by providing the power 305 to the battery management system. If the battery management system is provisioned or operating properly, the battery management system can transmit data 310 to the diagnostic tool 110. The diagnostic tool 110 can be used to power and communicate with the battery management system when the battery pack is installed in the vehicle 300 or when the battery pack is removed from the vehicle 300. A technical can remove one or more existing connecting cables from the battery pack 315 and connect one or more connecting cables of the diagnostic tool 110 to the battery pack 315.

The vehicle 300 can include a tunnel such as a gear tunnel. The gear tunnel can include an opening, compartment, chamber, or other area internal to the vehicle 300 that can store gear such as equipment or accessories for the vehicle or for use by the operator or passenger of the vehicle. The gear tunnel can extend across the vehicle 300. The gear tunnel can extend into the vehicle 300 but not fully across the vehicle 300. The gear tunnel can include at least one top portion, at least one bottom portion, at least one first side portion, and at least one second side portion. The gear tunnel can be disposed adjacent a cargo bed of the vehicle 300. The gear tunnel can be disposed adjacent the rear passenger area of the vehicle 300. The gear tunnel can be disposed between the cargo bed and the rear passenger area. The gear tunnel can be 60-70 inches long, 55-75 inches long, less than 55 inches long, or more than 75 inches long. The gear tunnel can be 18-19 inches wide, 17-20 inches wide, less than 18 inches wide, or more than 20 inches wide. The gear tunnel can be 19-21 inches high, 18-22 inches high, less than 18 inches high, more than 22 inches high.

A first door can cover a first end of the gear tunnel. A second door can cover a second end of the gear tunnel (for example on an opposite end of the gear tunnel). The doors can move between open and closed positions sealing or exposing an interior of the gear tunnel. The doors can hinge on a bottom side, a top side, or a lateral side. The door can be lowed (e.g., via a user pull on the door, a compressed spring pushing the door out, a compressed piston pushing the door out, a motor that runs to transport the door.). The diagnostic tool 110 can be structured to fit within the gear tunnel. For example, the diagnostic tool 110 can be sized to fit within the gear tunnel and be secured within the gear tunnel. For example, the dimensions of a housing of the diagnostic tool 110 can fit within the gear tunnel. The gear tunnel or a shuttle that extends from the gear tunnel can include a power connection. The power module 115 can connect with the power connection via a cable or connector. The power module 115 can receive power from the battery pack 315 via the power connection.

Figure 4:
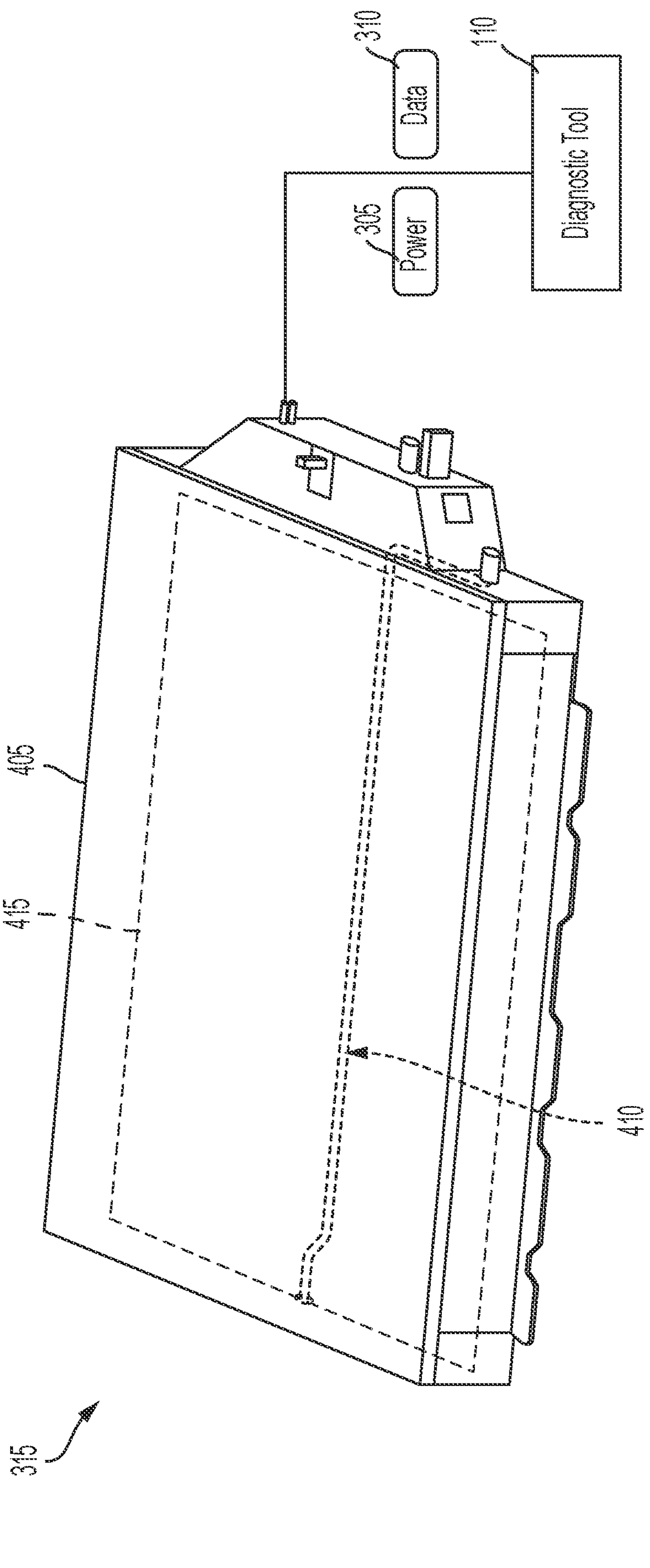
FIG. 4 depicts an example battery pack of a vehicle coupled to a diagnostic tool.

FIG. 4 depicts an example battery pack 315 of a vehicle 300 coupled to a diagnostic tool 110. The battery pack 315 can provide power to electric vehicle 300. Battery packs 130 can include any arrangement or network of electrical, electronic, mechanical or electromechanical devices to power a vehicle of any type, such as the electric vehicle 300. The battery pack 315 can include at least one housing 405. The housing 405 can include at least one battery module 130 or at least one battery cell 325, as well as other battery pack components. The housing 405 can include a shield on the bottom or underneath the battery module 130 to protect the battery module 130 from external conditions, for example if the electric vehicle 300 is driven over rough terrains (e.g., off-road, trenches, rocks, etc.). The battery pack 315 can include at least one cooling line 410 that can distribute fluid through the battery pack 315 as part of a thermal/temperature control or heat exchange system that can also include at least one thermal component 415. (e.g., a cold plate). The thermal component 415 can be positioned in relation to a top submodule and a bottom submodule, such as in between the top and bottom submodules, among other possibilities. The battery pack 315 can include any number of thermal components 415. For example, there can be one or more thermal components 415 per battery pack 315, or per battery module 130. At least one cooling line 410 be coupled with, part of, or independent from the thermal component 415.

The battery pack 315 can be removed from the vehicle 300. The battery pack 315 can be removed from the vehicle 300 so that a technician or user can perform testing on the battery pack 315. The battery pack 315 can be tested by a technician or user before the battery pack 315 is installed in the vehicle 300 for a first time, or reinstalled in the vehicle 300 after being removed from the vehicle 300. Because the battery pack 315 may be removed from a vehicle, components of the battery pack may not be connected such that they are powered, e.g., the battery management system may not be connected to power connections or communication connections. The diagnostic tool 110 can power the battery management system by providing the power 305 to the battery pack 315. Via the power 305, the powered battery management system can transmit data packets 310 on communication connections. The diagnostic tool 110 can receive the data 310 from the battery management system. The diagnostic tool 110 can connect to internal connections of the battery pack 315 through a service panel.

Figure 5:
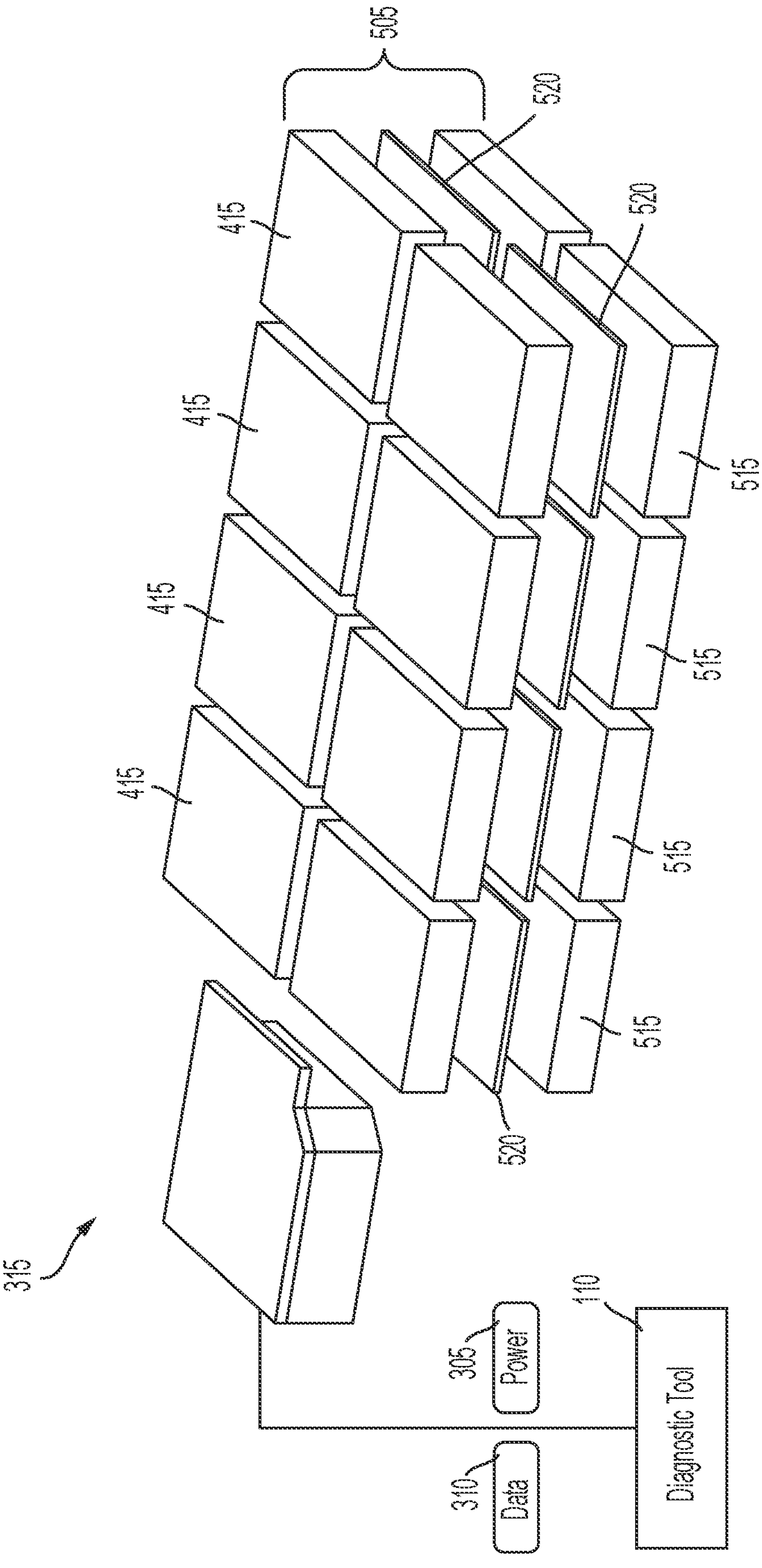
FIG. 5 depicts an example battery pack of a vehicle coupled to a diagnostic tool.

FIG. 5 depicts an example battery pack 315 of a vehicle 300 coupled to the diagnostic tool 110. The battery pack 315 can include battery modules 505. The battery modules 505 can include at least one submodule. For example, the battery modules 505 can include at least one first (e.g., top) submodule 510 or at least one second (e.g., bottom) submodule 515. At least one thermal component 415 (e.g., a cold plate) can be disposed between the top submodule 510 and the bottom submodule 515. For example, one thermal component 415 can be configured for heat exchange with one battery module 505. The thermal component 415 can be disposed or thermally coupled between the top submodule 510 and the bottom submodule 515. One thermal component 415 can also be thermally coupled with more than one battery module 505 (or more than two submodules 510, 515). The battery submodules 510, 515 can collectively form one battery module 505. In some examples each submodule 510, 515 can be considered as a complete battery module 505, rather than a submodule.

The battery modules 505 can each include a plurality of battery cells. The battery modules 505 can be disposed within the housing 405 of the battery pack 315. The battery modules 505 can include battery cells that are cylindrical cells, prismatic cells, or pouch cells, for example. The battery module 505 can operate as a modular unit of battery cells. For example, a battery module 505 can collect current or electrical power from the battery cells 325 that are included in the battery module 505 and can provide the current or electrical power as output from the battery pack 315. The battery pack 315 can include any number of battery modules 505. For example, the battery pack can have one, two, three, four, five, six, seven, eight, nine, ten, eleven, twelve or other number of battery modules 505 disposed in the housing 405. It should also be noted that each battery module 505 may include a top submodule 510 and a bottom submodule 515, possibly with a thermal component 415 in between the top submodule 510 and the bottom submodule 515. The battery pack 315 can include or define a plurality of areas for positioning of the battery module 505. The battery modules 505 can be square, rectangular, circular, triangular, symmetrical, or asymmetrical. In some examples, battery modules 505 may be different shapes, such that some battery modules 505 are rectangular but other battery modules 505 are square shaped, among other possibilities. The battery module 505 can include or define a plurality of slots, holders, or containers for a plurality of battery cells.

The battery pack 315 including the battery modules 505 can be removed from the vehicle 300 is shown to be electrically connected with the diagnostic tool 110. The diagnostic tool 110 can provide the power 305 to a battery management system of the battery pack 315. The power 305 can power the various processing or communication components of the battery pack 315. Based on the power 305, the battery pack 315 can transmit the data 310 to the diagnostic tool 110. The data 310 can include characteristics of the battery modules 505, the submodules 510, the battery cells of the battery pack 315.

Figure 6:
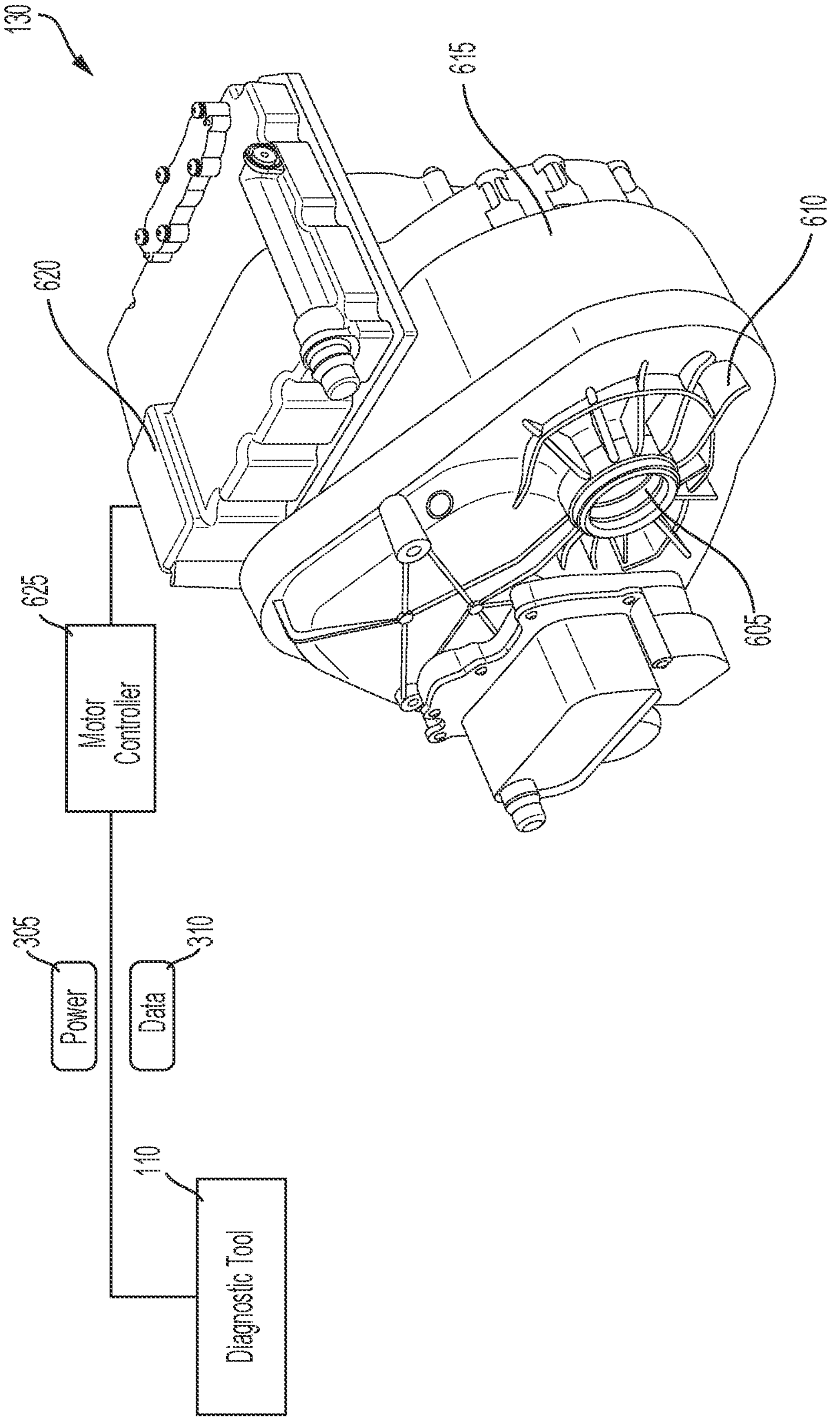
FIG. 6 depicts an example motor of a vehicle coupled to a diagnostic tool.

FIG. 6 depicts an example vehicle component 130, such as a motor of a vehicle, coupled with the diagnostic tool 110. The motor 130 can drive at least one axel or wheel of the vehicle 300 to transport the vehicle 300. For example, the motor can provide torque to the wheels 360 or 365 to cause the vehicle 300 to drive forwards, drive in reverse, turn, or park. The motor 130 can include a connector 605 to connect an output shaft. The connector 605 can be surrounded by an end shield 610 of a motor housing 615. The motor 130 can be controlled by a motor controller 625. The motor controller 625 can be separate from the motor 130. The motor controller 625 can be integrated with the motor 130. The motor controller 625 can control or regulate direction of the motor 130, speed of the motor 130, torque provided by the motor 130. The motor controller 625 can cause at least one of the front wheels 360 or at least one of the rear wheels 365 to operate to drive the vehicle 300 forward, reverse, turn, park, accelerate, decelerate, perform regenerative braking.

The diagnostic tool 110 can connect with the motor controller 625 and the motor controller 625 can connect with the terminal box 620. The diagnostic tool 110 can connect with the motor controller 625 via the terminal box 620 if the motor controller 625 is integrated with the motor 130. The diagnostic tool 110 can provide power to the motor controller 625 activating various components of the motor controller 625, e.g., at least one data processing system of the motor controller 625. The diagnostic tool 110 can provide the power 305 to power the motor controller 625 when the motor controller 625 or the motor 130 are not installed within the vehicle 300 and are not receiving power from the battery pack 315. The diagnostic tool 110 can provide the power 305 to power the motor controller 625 when the motor controller 625 or the motor 130 are is installed within the vehicle 300 but is not receiving power from the battery pack 315. For example, when the motor controller 625 or the motor 130 are not connected to the battery pack 315 or the battery pack 315 is unable to provide power to the motor controller 625 or the motor 130.

Figure 7:
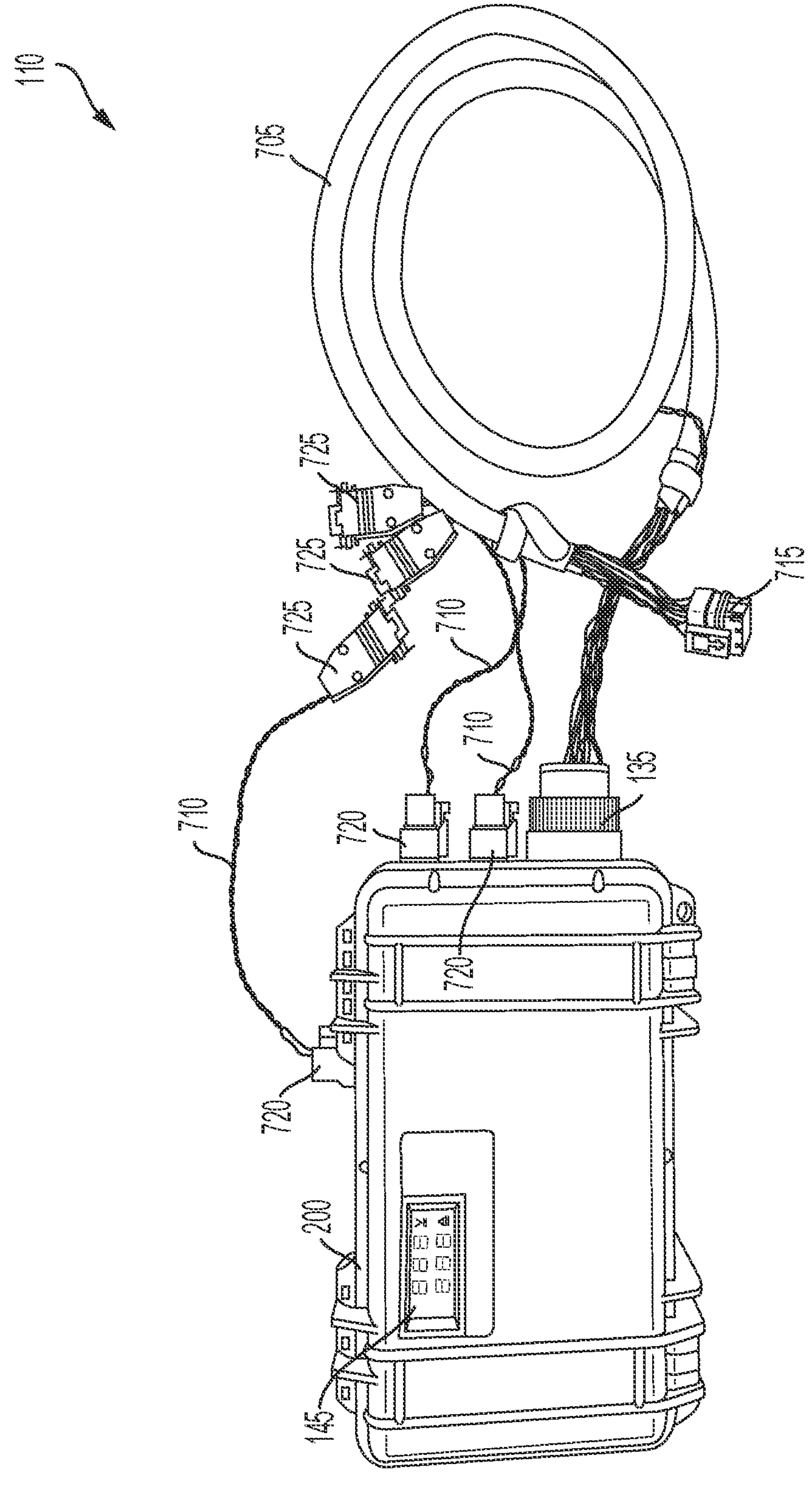
FIG. 7 depicts a diagnostic tool including cables.

FIG. 7 depicts a diagnostic tool 110 including cables. The diagnostic tool 110 can include a cable 705. The cable 705 can be a component of the connector 135. A first end of the cable 705 can connect to the diagnostic tool 110 through the connector 135. Another end of the cable 705 can include a plug 715 that interfaces with the vehicle component 130. The connector 135 can be or include a deutsch round connector (HDP24-24-21PN connector), an RS-485 connector, an Ethernet connector, a USB connector, or any other connector. The plug 715 can be or include an HDP26-26-21SN connector, an RS-485 connector, an Ethernet connector, a USB connector, or any other connector. The plug 715 can make electrical connections with the battery pack 315, e.g., with a battery management system (BMS) of the battery pack 315.

The diagnostic tool 110 includes at least one cable 710. The diagnostic tool 110 can include multiple cables 710 for making electrical connections for one or multiple different communication channels. The cables 710 can include plugs 720. The plugs 720 can plug into a connector of the diagnostic tool 110. The plugs 720 or the connectors of the diagnostic tool 110 can be or include a deutsch 3-pin connector (DT04-3P connector), an RS-485 connector, an Ethernet connector, a USB connector or any other kind of connector. The cables 710 can include plugs 725. The plugs 725 can plug into connectors of the external tool 140 or another external tool. The plugs 725 or the connectors of the external tool 140 can be an DB9 connector, an RS-485 connector, an Ethernet connector, a USB connector, or any other connector.

The housing 200 can include an opening through which the user interface 145 can be viewed. The user interface 145 can be fixed to sides of the opening to display a voltage applied to the vehicle component 130, a current sourced by the vehicle component 130, or a power sourced by the vehicle component 130. The user interface 145 and the opening of the housing 200 can be sealed via rubber, plastic, caulk, adhesive. The seal can prevent water, wind, rain, snow, dirt, dust, mud from entering the housing 200 through the opening. The user interface 145 can be located remote from the housing 200. For example, the user interface 145 can communicate with the sensor 120 via wires or wireless communication.

Figure 8:
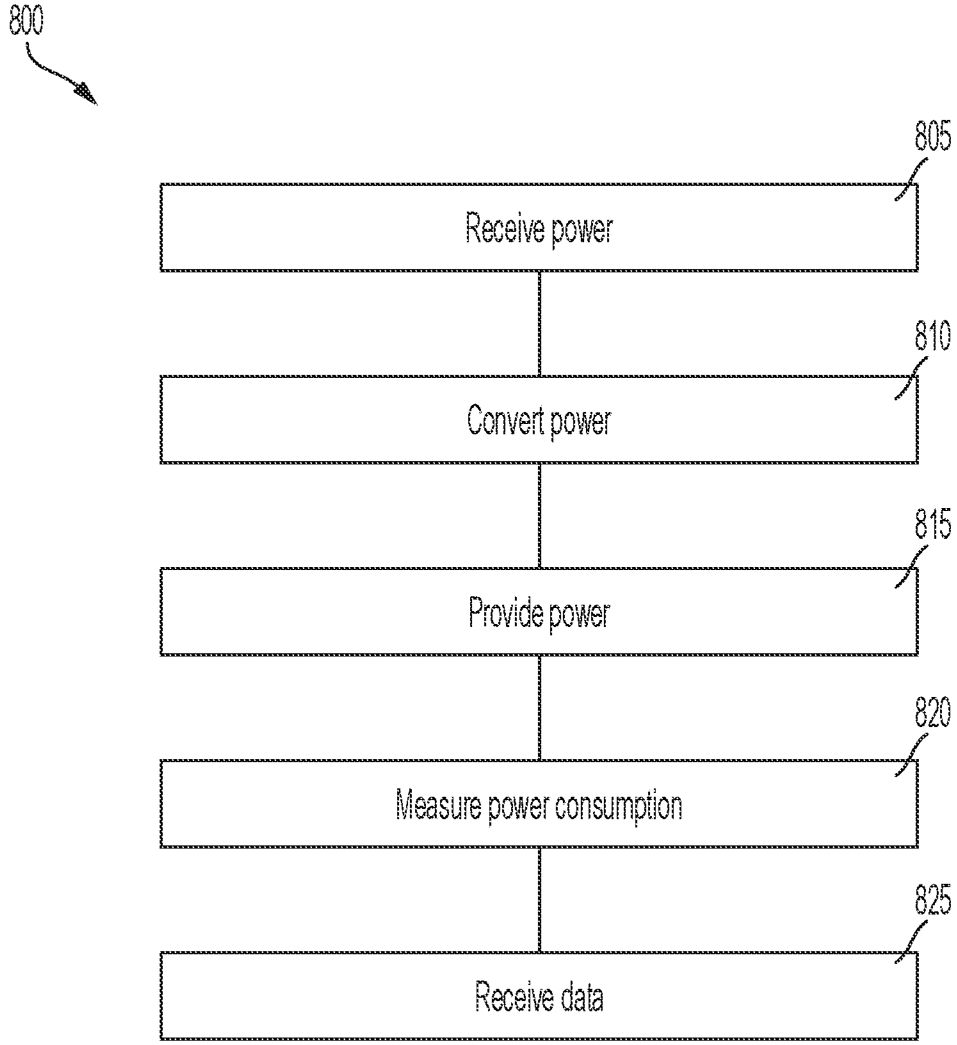
FIG. 8 depicts an example method for a diagnostic tool.

FIG. 8 depicts an example method 800 for a diagnostic tool. At least one ACT of the method 800 can be performed by the diagnostic tool 110. However, any tool, system, or device described herein can perform at least one ACT of the method 800. The method 800 can include an ACT 805 of receiving power. The method 800 can include an ACT 810 of converting power. The method 800 can include an ACT 815 of providing power. The method 800 can include an ACT 820 of measuring power consumption. The method 800 can include an ACT 825 of receiving data.

At ACT 805, the method 800 can include receiving, by the diagnostic tool 110, power. The diagnostic tool 110 can receive the power from the power source 105. The diagnostic tool 110 can receive the power by one or more cables, plugs, or other components internal or external to the diagnostic tool 110. The ACT 805 can include providing a connection cable of the connector 135. The connection cable can connect the connector to a connector of the vehicle component 130. The cable can make electrical connections with the vehicle component 130. The input module 205 of the diagnostic tool 110 can receive the power from the power source 105. The input module 205 can include a fuse 210 that can disconnect an electrical connection to the power source 105 responsive to an influx in current draw by the diagnostic tool 110 being greater than a level. The input module 205 can include a switch 215 that can switch the power from the power source 105 on or off. The diagnostic tool 110 can connect with the vehicle component 130 to electrically couple with the vehicle component 130. The diagnostic tool 110 can couple with the vehicle component 130 via the connector 135. The connector 135 can make at least one electrical connection with the vehicle component 130. The diagnostic tool 110 can provide power to the vehicle component 130 via at least one first electrical connection. The diagnostic tool 110 can receive data packets from the vehicle component 130 via at least one second electrical connection.

At ACT 810, the method 800 can include converting, by the diagnostic tool 110, power. The diagnostic tool 110 can covert the power received at ACT 805 or other power. For example, the power module 115 can convert power of a first type into power of a second type. For example, the power received from the power source 105 can be in a first type, e.g., AC power. The power module 115 can convert the power into a second type, e.g., DC power. The power module 115 can convert the power such that the vehicle component 130 can consume the power. The power module 115 can convert power from AC to DC or DC to AC. The power module 115 can adjust a voltage from a first level received from the power source 105 to a second level to be provided to the vehicle component 130. For example, the power module 115 can decrease a voltage from a first level to a second lower level. The power module 115 can increase a voltage from a first level to a second higher level.

At ACT 815, the method 800 can include providing, by the diagnostic tool 110, power. The diagnostic tool 110 can provide the converted power at ACT 810 to the vehicle component 130. The connector 135 can make at least one electrical connection with the vehicle component 130. The power can be provided to the vehicle component 130 via the electrical connection. For example, the connector 135 can make a hot connection and a ground connection. A voltage can be applied to the connections and current can be delivered via the connections. The power provided by the diagnostic tool 110 can power the vehicle component 130 or a component of vehicle component 130. For example, the diagnostic tool 110 can power the data processing system 260.

At ACT 820, the method 800 can include measuring, by the diagnostic tool 110, power consumption. The diagnostic tool 110 can include at least one sensor 120 to measure power consumed by the vehicle component 130. The diagnostic tool 110 can determine an amount of power consumed by the vehicle component 130 that the diagnostic tool 110 provides to the vehicle component 130. For example, a voltage sensor of the diagnostic tool 110 can measure a voltage provided by the diagnostic tool 110 to the vehicle component 130. Furthermore, a current sensor of the diagnostic tool 110 can measure a current sourced by vehicle component 130 from the diagnostic tool 110. The diagnostic tool 110 can, via a data processing system or logical component, compute a power consumption based on the voltage and sourced current. The diagnostic tool 110 can cause the user interface 145 to display a representation of the voltage, current, or power.

At ACT 825, the method 800 can include receiving, by the diagnostic tool 110, data. The diagnostic tool 110 can receive data packets from the vehicle component 130. The diagnostic tool 110 can receive data packets from the data processing system 260. The diagnostic tool 110 can receive the data packets from the connector 135. The diagnostic tool 110 can receive the data packets via electrical connections of the connector 135. The connector 135 can provide power to the vehicle component 130 and receive the data packet. The diagnostic tool 110 can provide the data packet to the external tool 140. For example, the diagnostic tool 110 can provide the data packet to the vehicle component 130 via the connector 250. The connector 250 can include electrical connections. The data packet can be provided to the external tool 140 via the electrical connections of the connector 250. The electrical connections of the connector 250 can be electrically coupled to the electrical connections of the connector 135. This electrical coupling can pass the data packets from the vehicle component 130 through the diagnostic tool 110 to the external tool 140.

The connector 135 can make electrical connections with multiple communication channels of the vehicle component 130. For example, the connector 135 can include at least one first electrical connection to receive data packets of a first communication channel, at least one second electrical connection to receive data packets of a second communication channel, or at least one third electrical connection to receive data packets of a third communication channel. The diagnostic tool 110 can provide the first data packets received for the first communication channel to a first connector 250. The diagnostic tool 110 can provide the second data packets received for the second communication channel to a second connector 250. The diagnostic tool 110 can provide the third data packets received for the third communication channel to a third connector 250. The first connector 250, the second connector 250, and the third connector 250 can provide data packets to the same external tool 140 or to different external tools.

Figure 9:
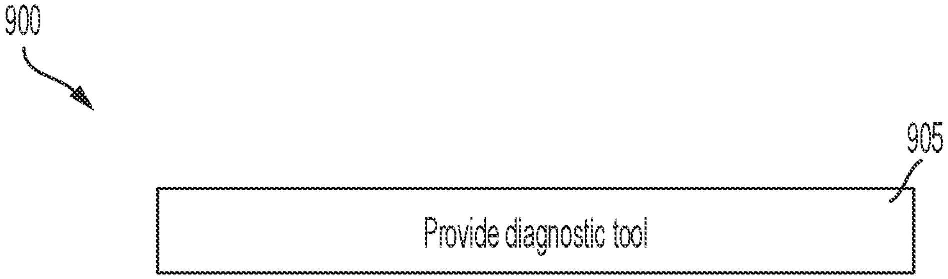
FIG. 9 depicts an example method for providing a diagnostic tool.

FIG. 9 depicts an example method for providing a diagnostic tool. The method 900 can include an ACT 905 of providing the diagnostic tool 110. The diagnostic tool 110 can include the connector 135. The connector 135 can be electrically coupled with the vehicle component 130. The connector 135 can make electrical connections with the vehicle component 130. For example, the connector 135 can include the power module 115. The power module 115 can provide power to the vehicle component 130 via at least one first electrical connection of the connector 135. The power module 115 can receive power from the power source 105 and convert the power. The converted power can be provided to the vehicle component 130 via the first electrical connection. The diagnostic tool 110 can include a communication component 125. The communication component 125 can receive data packets from the vehicle component 130. The communication component 125 can receive the data packets via at least one second electrical connection of the connector 135. The communication component 125 can include a connector 250. The connector 250 can provide the data packet to the external tool 140.

Figure 10:
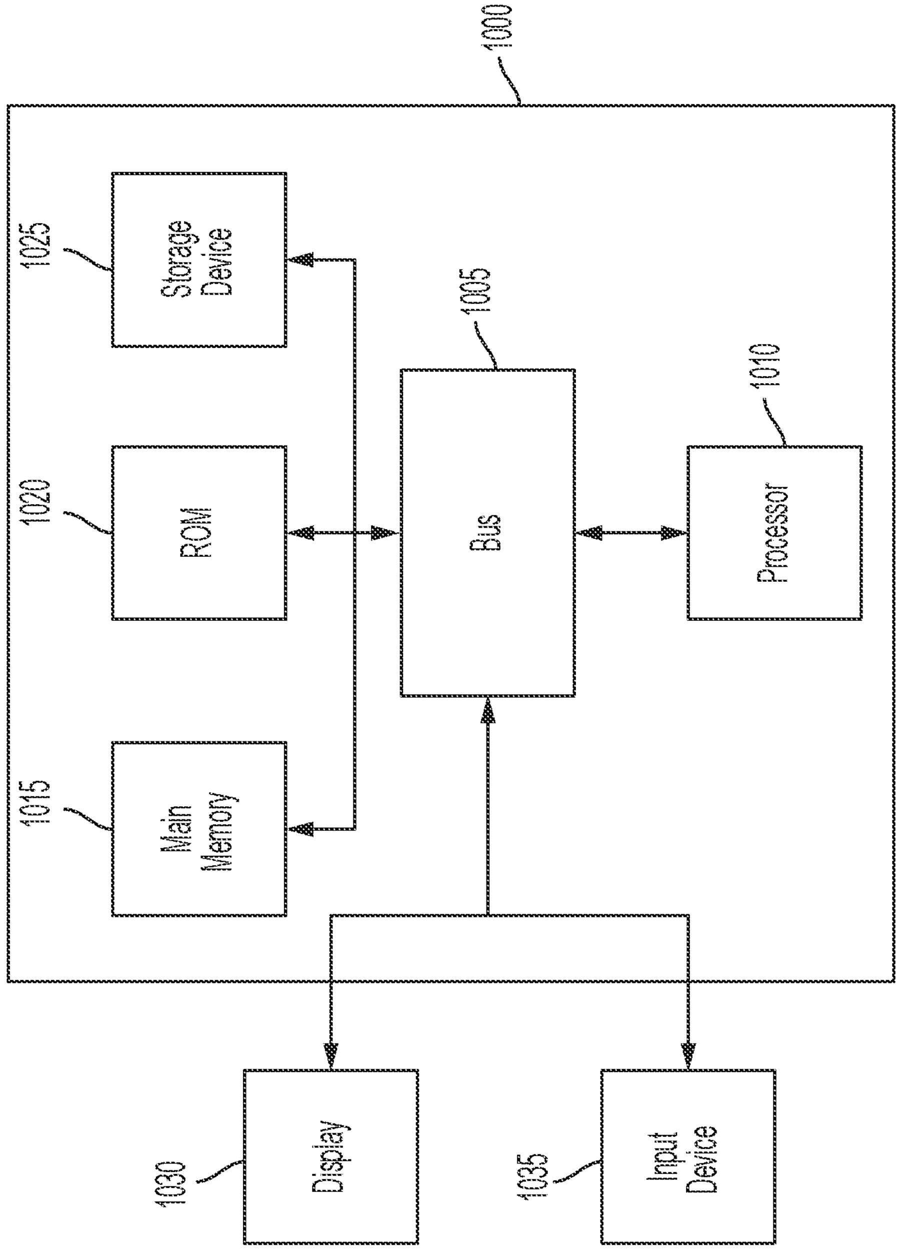
FIG. 10 depicts an example architecture for a computer system that can be employed to implement elements of the systems and methods described and illustrated herein.

FIG. 10 depicts an example block diagram of an example computer system 1000. The computer system or computing device 1000 can include or be used to implement a data processing system or its components. For example, the computing system described at FIG. 10 can be the data processing system 260. The computing system described at FIG. 10 can be a computing system of the diagnostic tool 110. The computing system 1000 includes at least one bus 1005 or other communication component for communicating information and at least one processor 1010 or processing circuit coupled to the bus 305 for processing information. The computing system 1000 can also include one or more processors 1010 or processing circuits coupled to the bus for processing information. The computing system 1000 also includes at least one main memory 1015, such as a random access memory (RAM) or other dynamic storage device, coupled to the bus 1005 for storing information, and instructions to be executed by the processor 1010. The main memory 1015 can be used for storing information during execution of instructions by the processor 1010. The computing system 1000 may further include at least one read only memory (ROM) 1020 or other static storage device coupled to the bus 1005 for storing static information and instructions for the processor 1010. A storage device 1025, such as a solid state device, magnetic disk or optical disk, can be coupled to the bus 1005 to persistently store information and instructions.

The computing system 1000 may be coupled via the bus 1005 to a display 1030, such as a liquid crystal display, or active matrix display, for displaying information to a user such as a driver of the electric vehicle 300 or other end user. An input device 1035, such as a keyboard or voice interface may be coupled to the bus 1005 for communicating information and commands to the processor 1010. The input device 1035 can include a touch screen display 1030. The input device 1035 can also include a cursor control, such as a mouse, a trackball, or cursor direction keys, for communicating direction information and command selections to the processor 1010 and for controlling cursor movement on the display 1030.

The processes, systems and methods described herein can be implemented by the computing system 1000 in response to the processor 1010 executing an arrangement of instructions contained in main memory 1015. Such instructions can be read into main memory 1015 from another computer-readable medium, such as the storage device 1025. Execution of the arrangement of instructions contained in main memory 1015 causes the computing system 1000 to perform the illustrative processes described herein. One or more processors in a multi-processing arrangement may also be employed to execute the instructions contained in main memory 1015. Hard-wired circuitry can be used in place of or in combination with software instructions together with the systems and methods described herein. Systems and methods described herein are not limited to any specific combination of hardware circuitry and software.

Although an example computing system has been described in FIG. 10, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C #, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of" 'A' and 13' can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. For example, the diagnostic tool can be a portable or stationary tool. For example the diagnostic tool can be integrated with a charging station of an electric vehicle. The diagnostic tool can be integrated within a vehicle. The diagnostic tool can include a data processing system that reads and analyzes data packets. The data processing system can identify diagnostics, display diagnostics, identify resolutions or maintenance tasks. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A device, comprising:

a connector to electrically couple with a motor controller of a drive of a vehicle via a first electrical connection of the connector and a second electrical connection of the connector;

the connector to provide power to the motor controller of the drive of the vehicle while the drive is removed from the vehicle via the first electrical connection of the connector, the drive of the vehicle disconnected from a power source of the vehicle; and a communication connector to receive, via the second electrical connection of the connector, a data packet from the motor controller of the drive of the vehicle comprising an indication of a characteristic of the drive.

2. The device of claim 1, comprising the communication connector to:

transfer a first data packet from the motor controller of the drive of the vehicle; and transfer a second data packet to the motor controller of the drive of the vehicle.

3. The device of claim 1, comprising:

an enclosure, the enclosure structured to fit within a gear tunnel of the vehicle that extends from an opening on at least one side of the vehicle into the vehicle; and a power supply to connect with a connection of the vehicle to receive power from a battery pack of the vehicle.

4. The device of claim 1, comprising an assembly comprising:

a switch configured to complete or break a connection to provide power received from a power source to the motor controller of the drive of the vehicle; and a fuse configured to break the connection responsive to a level of current provided by the power source exceeding a threshold.

5. The device of claim 1, comprising a data processing system comprising one or more processors, coupled with memory, to:

transfer data from a battery pack of the vehicle from a controller area network (CAN) of the battery pack via the connector, the data including values of characteristics of the battery pack;

generate a diagnostic for the battery pack based on the values of the characteristics of the battery pack; and cause a display to display the diagnostic.

6. The device of claim 1, comprising:

an external tool; and a second connector to make an electrical connection with the external tool and provide the data packet to the external tool via the electrical connection, the external tool configured to identify information included within the data packet and display the information on a display.

7. The device of claim 1, comprising an alternating current (AC) to direct current (DC) converter to:

transfer AC power from an external power supply;

convert the AC power to a DC power for consumption by the motor controller of the drive of the vehicle; and provide the DC power to the motor controller of the drive of the vehicle.

8. The device of claim 1, comprising:

the connector comprising a connection cable comprising a connector to connect with a battery management system of a battery pack.

9. The device of claim 1, comprising:

an enclosure comprising a lid that hinges from an open position to a closed position, wherein a power supply of the device and the communication connector are disposed within the enclosure;

wherein the lid forms a seal with a portion of the enclosure to prevent water or debris from entering the enclosure.

10. The device of claim 1, comprising:

a voltage sensor that determines a voltage provided to power connections of the motor controller of the drive of the vehicle and a current sensor that determines current sourced by the motor controller of the drive of the vehicle.

11. The device of claim 1, comprising:

a sensor to determine a power consumption of the motor controller of the drive of the vehicle; and a display to generate a visual representation of the power consumption.

12. The device of claim 1, wherein the first electrical connection is configured to connect to a battery management system, a motor, a high-voltage contactor, or a high-voltage interlock loop.

13. A method, comprising:

connecting, via a connector of a tool, with a component of a vehicle to electrically couple the tool with the component of the vehicle via a first electrical connection of the connector and a second electrical connection of the connector;

providing, by the connector, power to the component of the vehicle via the first electrical connection of the connector, the component of the vehicle disconnected from a power source of the vehicle;

transferring, by the connector, a plurality of data packets between the tool and the component of the vehicle, wherein the component of the vehicle is a battery pack and the plurality of data packets include characteristics of the battery pack;

providing, by a first communication connection of a communication connector, a first data packet of the plurality of data packets to a second tool; and providing, by a second communication connection of the communication connector, a second data packet of the plurality of data packets to at least one of the second tool and a third tool.

14. The method of claim 13, comprising:

providing, by the first communication connection, the first data packet to the second, the second tool configured to identify information included within the first data packet and display the information on a display.

15. The method of claim 13, comprising: receiving, by an alternative current (AC) to direct current (DC) converter of the tool, AC power from an external power supply; converting, by the AC to DC converter, the AC power to DC power for consumption by the battery pack; and providing, by the AC to DC converter, the DC power to the battery pack.

16. An electric vehicle tool, comprising:

a connector to electrically couple with a component of an electric vehicle via a first electrical connection of the connector and second electrical connections of the connector;

the connector to provide power to the component of the electric vehicle via the first electrical connection of the connector, the component of the electric vehicle disconnected from the a power source of the vehicle;

a communication connector to transfer a plurality of data packets between a first external tool and a second external tool and the component of the vehicle via a plurality of controller area network (CAN) channels and via the second electrical connections, wherein the component of the vehicle is a battery pack and the plurality of data packets include characteristics of the battery pack, the communication connector comprising:

a first communication connection to provide a first data packet of the plurality of data packets received via a first CAN channel of the plurality of CAN channels to a first external tool; and a second communication connection that provides a second data packet of the plurality of data packets received via a second CAN channel of the plurality of CAN channels to at least one of the first external tool and a second external tool.

17. The electric vehicle tool of claim 16, comprising:

a second connector that makes an electrical connection with an external tool and provides the data packet to the external tool via the electrical connection, the external tool configured to identify information included within the data packet and display the information on a display.

* * * * *